March 26, 1963  A. G. NERHEIM ETAL  3,082,619
GAS DENSITY BALANCE
Filed Oct. 27, 1959
2 Sheets-Sheet 1
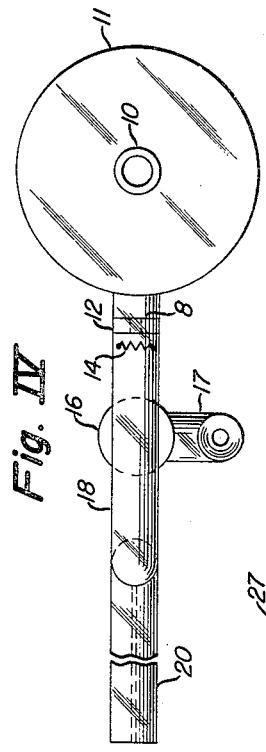
Fig. IV
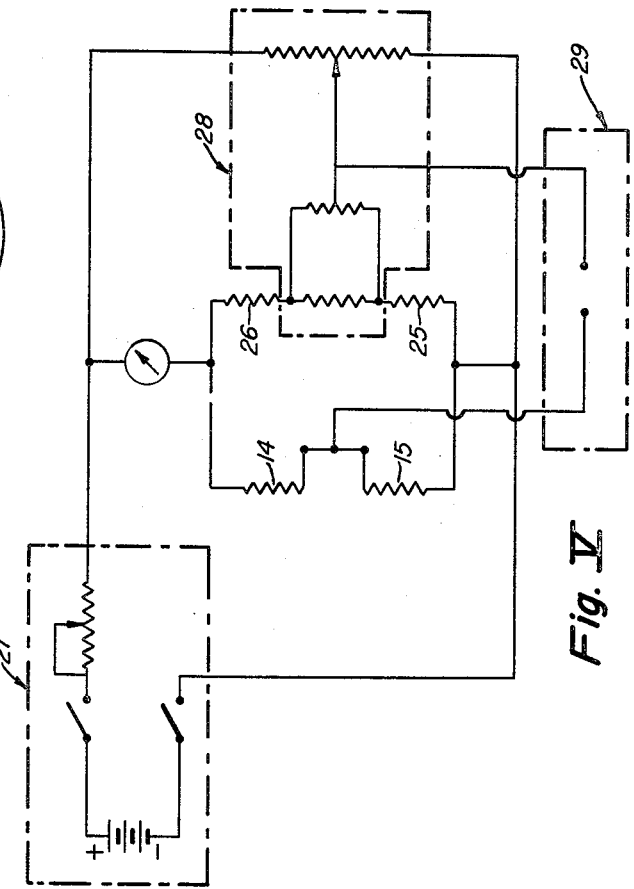
Fig. V
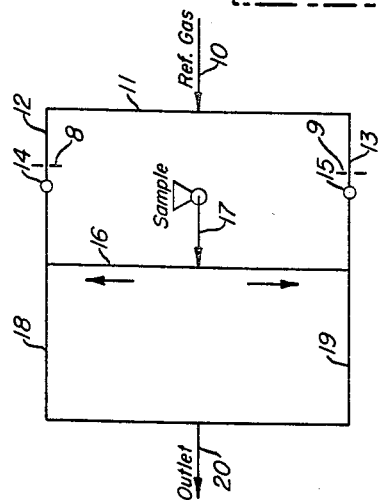
Fig. I
INVENTORS:
Arvie Glenn Nerheim
John Henry Rushton
BY
ATTORNEY

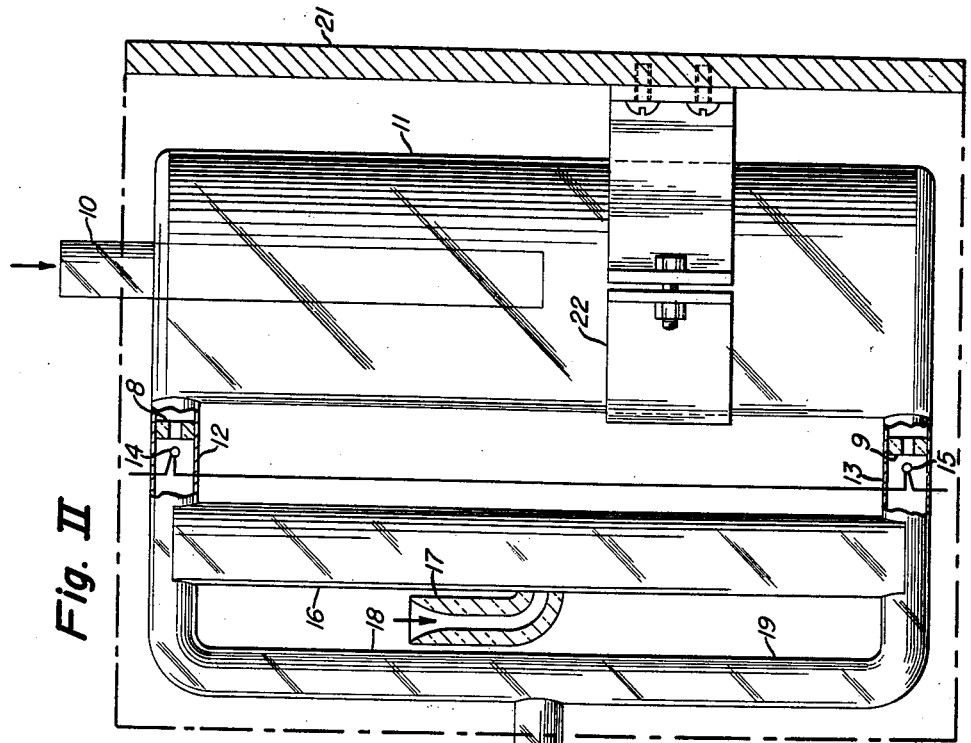
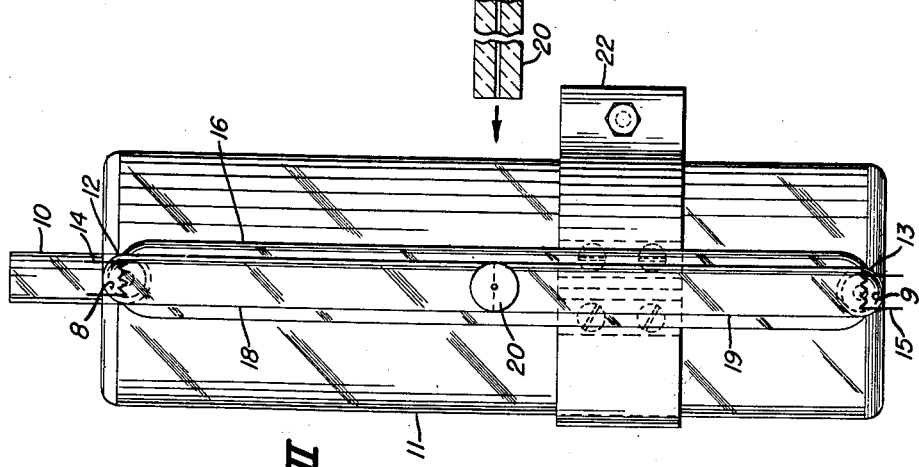

United States Patent Office 3,082,619
Patented Mar. 26, 1963

3,082,619
GAS DENSITY BALANCE
Arvie Glenn Nerheim, Crown Point, and John Henry Rushton, West Lafayette, Ind., assignors to Standard Oil Company, Chicago, Ill., a corporation of Indiana
Filed Oct. 27, 1959, Ser. No. 849,103
7 Claims. (Cl. 73—30)

This invention relates to the analyses of fluids by means of measuring the density thereof. More particularly, the invention relates to an improved apparatus for measuring gas and vapor densities as an adjunct to gas chromatography.

Gas chromatography, a new and useful technique for separation and analysis of complex mixtures of volatile materials, is a system wherein components of such mixtures are separated in simple and inexpensive equipment by partition between a stationary phase and a moving gas phase. A few microliters of sample can be analyzed in a relatively short time and the technique is applicable to samples ranging from fixed gases to those that must be distilled at low pressure.

The separations take place in small elongated columns packed with a specific type of solid packing which supports the stationary liquid phase. The liquid or substrate, usually amounting to about 40 weight percent of the packing, is distributed as a thin film that provides a large surface for the gas to contact. Components of a sample are separated as they are carried through the column by a moving carrier gas phase, called the eluting gas, and the eluted components are detected as they pass from the column. Nitrogen, helium, hydrogen and carbon dioxide are common eluting gases.

Typically one component of a binary mixture is less soluble in the stationary phase than the other and the less soluble component will tend to remain in the gas phase and be swept through the column at nearly the velocity of the eluting gas. The second component, however, will pass through the column at a lower rate because the process of dissolving in and expelling from the stationary liquid phase takes additional time. Because of differences in partition, the first and second components emerge from the column in the eluted gas at different times and thus are separated.

Several types of detectors have heretofore been proposed and tried for sensing the presence of the component in the eluting as and it is with respect to such detectors that this invention is directed.

Recently, component detectors have been devised which are sensitive to changes in density of the eluted gas caused by the presence of a component of the sample. These so-called gas density balances respond to density changes in a manner which is fast, accurate, and insensitive to flowrate; they may produce an electrical output which is linear with variations in density.

An outstanding type of gas density balance apparatus employs twin flow detectors in a flowing reference gas stream, the reference stream being split into two streams, each of which passes over one of the twin flow detectors. These detectors are temperature-sensitive electrically-heated elements such as platinum filaments or thermistors which may be connected in an electrical bridge circuit. The sample stream is introduced into the apparatus downstream of the twin detectors, and when such sample stream contains a component having a density greater than that of the reference gas, flow tends downward with the result that the reference gas is diverted and the flow over one flow detector is reduced while the flow over the other is increased. This cools the latter detector at a greater rate and permits the other detector to increase in temperature (because of slower dissipation of heat therefrom), causing the imbalance in an electrical bridge circuit. The resulting net change in the electrical resistances of the detectors is then measured as an indication of the density of the gas sample.

It has now been discovered, in accordance with the invention, that the sensitivity of gas density balances with respect to density changes may be increased severalfold by placing local flow restrictions in the reference gas streams near the twin flow detectors. As a consequence, for any given change in density of the eluted gas there is a much larger change in flowrate across each detector. Hence the temperature of the detectors, being a function of flowrate, is altered by a considerably larger amount than heretofore.

A simple yet suitable restriction comprises an orifice plate or tube, placed either upstream, downstream, or around each detector. In a more elaborate embodiment, the restriction may be placed in the vena contracta of a venturi tube. In any event, the restriction and detector are located sufficiently close so that the detector is exposed to the accelerated flow of reference gas through the restriction.

Further details and advantages of the described system will be discussed by reference to the accompanying drawings wherein:

FIGURE I is a schematic view in partial section of a gas density balance constructed in accordance with the invention;

FIGURE II is an elevation of a preferred embodiment of the apparatus embodying the principles of FIGURE I;

FIGURE III is a side view of the apparatus in FIGURE II;

FIGURE IV is a top view of the apparatus illustrated in FIGURES II and III; and

FIGURE V is a diagrammatic showing of an electrical bridge circuit including the filament detectors and adapted for use in conjunction with the apparatus of FIGURES II, III, and IV.

Referring to FIGURE I, the reference gas is introduced by reference gas inlet tube 10 into the mid-point of reference gas chamber 11. The flow of reference gas from the reference gas chamber 11 is divided between top detector conduit or tube 12 and bottom detector tube 13. Detector thermistors 14 and 15 are disposed in detector tubes 12 and 13, respectively, and are located about 1/32″ downstream of restriction orifices 8 and 9, respectively. The sample tube 16 extends between the top detector tube 12 and the bottom detector tube 13 and is provided with sample inlet 17.

When a gas sample entering sample tube 16 contains a sample component having a density greater than that of the reference gas flowing through the balance, the flow in sample tube 16 tends downward. This decreases flow across the bottom detector tube 13 and increases flow across the top detector tube 12. This results in a net change in the resistances of the thermistors 14 and 15 which change is measured as an indication of the density of the gas sample introduced into the balance.

The reference gas of now adjusted composition and differing flow rate passes from top detector tube 12 into top outlet tube 18 and from bottom detector tube 13 into bottom outlet tube 19. The combined flow from outlet tubes 18 and 19 emerges from the balance by way of outlet tube 20 which is a flow-restrictive capillary.

Referring to FIGURES II, III and IV, the dimensions of the apparatus schematically shown in FIGURE I have been chosen to make the most effective use of any change in density to vary the filament resistances. In FIGURE II, sample inlet 17 is shown for clarity in a rotated position. In FIGURES II, III and IV, the reference gas inlet tube 10 has an I.D. of 4 mm., the reference gas chamber 11 is about 100 mm. high with a diameter of about 30 mm. Restrictions 8 and 9 have an inner diameter of about 0.04 inches. The reference gas inlet tube 10 is shown as extending through the top wall of the reference gas chamber 11 and it is contemplated that such inlet tube 10 may alternatively enter the chamber 11 through the bottom end wall or a side wall. In any event, it is desired to provide for the discharge of the reference gas from the inlet tube 10 at about the geometric center of the chamber 11.

The top and bottom detector tubes 12 and 13 have an I.D. of about 4 mm. The sample tube 16 has an I.D. of about 8 mm., and the sample inlet 17 comprises an elbow having an I.D. of about 2 mm. The outlet capillary tube 20, receiving flow from the top and bottom outlet tubes 18 and 19, has an I.D. of about 0.7 mm. and a length of 40 mm.

One objective in selecting these dimensions is to maximize the effect of change in density caused by the sample and to minimize the pressure drop caused by friction of gas flow, so as to obtain high sensitivity to changes in density consistent with linearity and speed of response.

The sample tube 16 is kept to a small volume to give a fast response. Increasing the height of the sample tube 16 increases the driving force of the differences in density but it also increases friction and volume; increasing the diameter of the sample tube 16 also increases volume but it has the beneficial effect of decreasing friction. It tends to compensate for viscosity whereas the effects of viscosity may otherwise be such as to cause non-linear response.

As the driving force is expended in the top and bottom detector tubes 12 and 13, the resistances of the thermistors 14 and 15 change with change in temperature which, in turn, reflects the changes in rates of flow over the filaments. Thus the arrangement and dimensions given provide a gas density balance which satisfies the need for a gas chromatographic analysis detector that is sensitive, fast, and requires no calibration for individual compounds. It is contemplated that balances of other characteristics may be devised in view of the description herein given. If more sensitivity is needed, the height and diameter of the sample tube 16 can be increased and the length of the detector tubes 12 and 13 may be shortened, although this latter modification would run the risk of allowing some sample to reach the filaments and make the response nonlinear as discussed above.

The complete unit is housed within a temperature-controlled cabinet 21 and supported within the cabinet 21 by any suitable means, such as a bracket 22 clamped to the reference gas chamber 11, for example. It will be apparent that the reference gas inlet tube 10 extends through a top wall of the cabinet 21 and that the outlet capillary tube 20 projects through an end wall thereof. Suitable temperature control means including heaters, thermostats, and the like can be provided for controlling the temperature of the cabinet 21. However, since such temperature control systems are well known in the art, details are not given here.

Referring to FIGURE V, there is shown a Wheatstone bridge circuit with standard resistances 25 and 26 and the detector thermistors 14 and 15 comprising hot resistance elements. A constant voltage supply 27, a zero adjusting means 28, and an output voltage-responsive means such as recorder 29, complete a typical bridge circuit. This general type of bridge circuit and its operation are well known and will not be described in further detail.

To demonstrate the improved sensitivity of a gas density balance employing the instant invention, two substantially identical balances were constructed. One was made without flow restrictions near the filament detectors while the other had a pair of 0.04" I.D. by 0.005" thick orifices located 0.04" upstream of the filaments. The first balance had a sensitivity of $$156 \frac{mv. \, ml.}{mg.}$$

while the second per the invention had a sensitivity of $$476 \frac{mv. \, ml.}{mg.}$$

In other terms, it was more than 2½ times as sensitive as a result of the invention.

The top and bottom detector tubes 12 and 13 contain the thermistors 14 and 15, respectively, but it is also contemplated that they may be replaced by filaments.

Although the invention has been described with reference to a preferred embodiment thereof, it is to be understood that this is by way of illustration only. Accordingly, it is contemplated that modifications and variations can be made in the apparatus by those skilled in the art in light of the preceding description without departing from the spirit of the invention.

What is claimed is:

1. In an apparatus for measuring the density of a gas having in combination a reference gas flow system including a pair of vertically displaced reference gas flow conduits of substantially constant cross-sectional area, a flow-restrictive outlet means from said system, a sample tube communicating with said reference gas flow conduits, and detector means in each of said reference gas flow conduits for determining differentials in rates of flow through said conduits due to changes in flow of sample gas from said sample tube into said conduits, the improvement whereby the sensitivity of said apparatus is increased which comprises a flow restriction in each of said reference gas flow conduits disposed near said detector means to increase the flow-rate across said detector means of reference gas flowing through said reference gas flow conduits.

2. The apparatus of claim 1 wherein said reference gas system includes in addition to said conduits, a reference gas manifold chamber with which said conduits communicate, and a reference gas inlet line discharging into said chamber.

3. The apparatus of claim 2 wherein said detector means comprises a pair of heated elements, one in each conduit, connected in a bridge circuit.

4. The apparatus of claim 3 wherein said elements comprise wire filaments.

5. The apparatus of claim 3 wherein said elements comprise thermistors.

6. The apparatus of claim 1 wherein said flow restriction comprises an orifice tube.

7. The apparatus of claim 1 wherein said detector means are located downstream of said flow restriction.

References Cited in the file of this patent

UNITED STATES PATENTS

| | | |
|---|---|---|
| 2,136,991 | De Blois | Nov. 15, 1938 |
| 2,509,889 | Shockley | May 30, 1950 |
| 2,694,928 | Jacobson | Nov. 23, 1954 |
| 2,728,219 | Martin | Dec. 27, 1955 |
| 2,838,927 | Gray | June 17, 1958 |
| 2,890,586 | Martin | June 16, 1959 |

OTHER REFERENCES

"Vapor Phase Chromatography" (Desty), published by Butterworth (London) 1956 (article by Munday et al., pages 146 and 147 relied on. Copy in Scientific Library and in Div. 36).